US009107209B2

(12) United States Patent
Liu (10) Patent No.: US 9,107,209 B2
(45) Date of Patent: Aug. 11, 2015

(54) METHOD AND APPARATUS FOR TRIGGERING AND TRANSMITTING UPLINK SOUNDING REFERENCE SIGNAL

(75) Inventor: Jin Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 134 days.

(21) Appl. No.: 13/884,305

(22) PCT Filed: Oct. 25, 2011

(86) PCT No.: PCT/IB2011/002960
§ 371 (c)(1),
(2), (4) Date: May 9, 2013

(87) PCT Pub. No.: WO2012/063131
PCT Pub. Date: May 18, 2012

(65) Prior Publication Data
US 2013/0294400 A1 Nov. 7, 2013

(30) Foreign Application Priority Data
Nov. 9, 2010 (CN) .......................... 2010 1 0539348

(51) Int. Cl.
*H04W 4/00* (2009.01)
*H04B 7/00* (2006.01)
(Continued)

(52) U.S. Cl.
CPC ........... *H04W 72/0413* (2013.01); *H04L 5/001* (2013.01); *H04L 5/0037* (2013.01);
(Continued)

(58) Field of Classification Search
USPC ................................................ 370/310–350
See application file for complete search history.

(56) References Cited

U.S. PATENT DOCUMENTS 8,717,938 B2* 5/2014 Wang et al. ................... 370/254
8,787,289 B2* 7/2014 Noh et al. ..................... 370/329
(Continued)

FOREIGN PATENT DOCUMENTS

CN 101541029 A 9/2009
CN 101827444 A 9/2010

OTHER PUBLICATIONS

Alcatel-Lucent Shanghai Bell e al., "Configuration for Dynamic Aperiodic SRS Triggering," $3^{rd}$ Generation Partnership Project (3GPP), 3GPP TSG RAN WG1 Meeting #63, R1-105995, pp. 1-5, Jacksonville, USA, Nov. 15-19, 2010.
(Continued)

*Primary Examiner* — Warner Wong
(74) *Attorney, Agent, or Firm* — Fay Sharpe LLP (57) ABSTRACT

Embodiments of the present invention disclose methods and apparatuses for dynamically triggering an uplink sounding reference signal for a carrier aggregation system, methods and apparatus for transmitting an uplink sounding reference signal for a carrier aggregation system. One embodiment discloses a method for dynamically configuring an uplink sounding reference signal for a carrier aggregation system, wherein an uplink schedule in the system comprises an SRS request field. The method comprises: pre-assigning mapping relationships between different values of the SRS request in the uplink schedule and joint coding of a carrier aggregation parameter and at least one user-specific RSR parameters, the carrier aggregation parameter indicating one or more carrier components; determining the carrier aggregation parameter and the at least one user-specific SRS parameter; assigning values to the SRS request field in the uplink schedule based on the pre-assigned mapping relationships, the determined carrier aggregation parameter and the at least one user-specific SRS parameter; transmitting the uplink schedule.

15 Claims, 6 Drawing Sheets

(51) Int. Cl.
*H04W 72/04* (2009.01)
*H04L 5/00* (2006.01)
*H04W 24/00* (2009.01)
*H04W 28/18* (2009.01)
*H04W 72/00* (2009.01)
*H04W 72/12* (2009.01)

(52) U.S. Cl.
CPC ............ *H04L5/0051* (2013.01); *H04L 5/0082* (2013.01); *H04L 5/0096* (2013.01); *H04L 5/0064* (2013.01); *H04W 24/00* (2013.01); *H04W 28/18* (2013.01); *H04W 72/00* (2013.01); *H04W 72/12* (2013.01)

(56) References Cited

U.S. PATENT DOCUMENTS

| | | | | |
|---|---|---|---|---|
| 8,837,394 | B2* | 9/2014 | Lin et al. | 370/329 |
| 8,849,292 | B2* | 9/2014 | Tiirola et al. | 455/450 |
| 2010/0232385 | A1* | 9/2010 | Hsu | 370/329 |
| 2011/0013546 | A1* | 1/2011 | Hao et al. | 370/294 |
| 2011/0176480 | A1* | 7/2011 | Dahlman et al. | 370/328 |
| 2011/0249639 | A1* | 10/2011 | Jen | 370/329 |
| 2012/0320872 | A1* | 12/2012 | Yang et al. | 370/330 |
| 2013/0242911 | A1* | 9/2013 | Heo et al. | 370/329 |
| 2014/0035859 | A1* | 2/2014 | Wilson et al. | 345/174 |

OTHER PUBLICATIONS

Motorola, "On Triggering of Dynamic Aperiodic Sounding," 3$^{rd}$ Generation Partnership Project (3GPP), 3GPP TSG RAN WG1 Meeting #62bis, R1105634, pp. 1-2, Xi'an, China, Oct. 11-15, 2010.
International Search Report for PCT/IB2011/002960 dated Apr. 12, 2012.
"Way Forward on Aperiodic SRS," 3GPP TSG RAN WG1 #62bis, Xian, China, Oct. 11-15, 2010, R1-105787, Samsung, Qualcomm, Nokia, Nokia Siemens Networks, AlcatelLucent, ASS, ZTE, Sharp, Panasonic, NT DaCOMa, 2 pages.
"Resources for Dynamic SRS Multiplexing," 3GPP TSG RAN WG1 #62, Madrid, Spain, Aug. 23-28, 2010, Agenda item: 6.5.2.1, Source: Samsung, Document for: Discussion and Decision.
"LTE-A Dynamic Aperiodic SRS—Triggering, Duration, Timing, and Carrier Aggregation," 3GPP TSG RAN WG1 Meeting #61, Montreal, Canada, May 10-14, 2010, Agenda Item: 6.5.2.1, Source: Motorola R1-103187, Document for: Discussion and Decision.

* cited by examiner

METHOD AND APPARATUS FOR TRIGGERING AND TRANSMITTING UPLINK SOUNDING REFERENCE SIGNAL

FIELD OF THE INVENTION

The present invention relates to a carrier aggregation system, and in particular, relates to a method and an apparatus for dynamically triggering an aperiodic uplink sounding reference signal for a carrier aggregation system and a method and an apparatus for transmitting an aperiodic uplink sounding reference signal for a carrier aggregation system.

DESCRIPTION OF THE RELATED ART

In a communication system, for example, LTE and its further evolution system, it is required to determine a channel quality using an uplink sounding reference signal SRS, so as to perform frequency selective scheduling over uplink. Uplink sounding reference signals between different users need maintaining orthogonal or approximately orthogonal so as to obtain a more accurate channel quality sounding result, thereby further affecting uplink scheduling, or even system performance.

The current LTE Rel-8 proposes periodic SRS triggering, as well as assigning configuration parameters for periodic SRS triggering by RRC signaling. However, RRC signaling is a high-level signaling, whose cycle is rather long, for example, a level of 15 ms. This periodic SRS triggering mechanism always cannot keep up with the change speed of channel condition, user configuration, and carrier component in a system, such that the periodic SRS triggering mechanism cannot satisfy the demands of LTE-A Rel-10 resource scheduling. Therefore, it is desirable for aperiodic SRS triggering.

With further evolution of LTE, a carrier aggregation technology is introduced. Compared with the solution of configuring one carrier for each cell in the LTE system, each cell in the further evolution system of LTE may be configured with multiple carriers that are called component carriers CC, and each UE may also have multiple CCs to serve it. Consequently, it increases the probability of collision (namely, impossible to guarantee a good orthogonality) during SRS transmission between different users.

In the proposition R1-105398 "Resources for Dynamic SRS Multiplexing," Samsung Corporation proposes an indirect configuration method for indicating possible states of some combinations of cyclic shifts CS and transmission comb offset amounts in aperiodic SRS parameters by borrowing 8 states of unused channel state information (CSI) in a downlink control information DCI format. However, this indirect solution has a plurality of problems. When it is required to schedule uplink shared channel (UL-SCH) data while triggering an SRS transmission on a same subframe, this approach of configuring SRS parameters based on borrowing CSI field will cause confliction, because data scheduling also needs using the CSI field. Moreover, this configuration method does not take carrier aggregation CA into account. If it is requested in a subframe to transmit SRS over a plurality of UL CCs and these UL CCs have no corresponding PUSCH data transmission, then this approach needs additional uplink schedule (UL grant) for the aperiodic SRS request. If a plurality of UL schedules with respect to aperiodic SRS requests for different UL CCs are transmitted in a plurality of consecutive subframes, SRS transmission delay on respective UL CCs will be significantly increased. On the other hand, if an aperiodic SRS triggering in an uplink schedule is inflexibly interpreted to be directed to all configured multiple UL CCs, then all UL CCs will perform aperiodic SRS transmission, even some of the UL CCs actually do not need the SRS transmission, which may incur additional SRS transmission overhead.

Therefore, it is desirable to provide a dynamic triggering solution for an effective uplink sounding reference signal SRS which is adapted for a carrier aggregation system.

SUMMARY OF THE INVENTION

In view of the problems existing in the prior art, embodiments of the present invention provide methods and apparatuses for dynamically triggering an aperiodic uplink sounding reference signal for a carrier aggregation system.

According to one embodiment of the present invention, there is provided a method of dynamically triggering an aperiodic uplink sounding reference signal SRS for a carrier aggregation system, wherein an uplink schedule in the system comprises an SRS request field, the method comprising:

pre-assigning mapping relationships between different values of the SRS request field in the uplink schedule and joint coding of a carrier aggregation parameter and at least one user-specific SRS parameter, the carrier aggregation parameter indicating one or more carrier component;

determining the carrier aggregation parameter and the at least one user-specific SRS parameter;

assigning values to the SRS request field in the uplink schedule based on the pre-assigned mapping relationships, the determined carrier aggregation parameter, and the at least one user-specific SRS parameter;

transmitting the uplink schedule.

According to another embodiment of the present invention, there is provided a method of transmitting an aperiodic uplink sounding reference signal SRS for a carrier aggregation system, wherein an uplink schedule in the system comprises an SRS request field, the method comprising:

pre-assigning mapping relationships between different values of the SRS request field in an uplink schedule and joint coding of a carrier aggregation parameter and at least one user-specific SRS parameter, the carrier aggregation parameter indicating one or more carrier component;

receiving the uplink schedule;

de-mapping the SRS request field in the received uplink schedule based on the pre-assigned mapping relationships so as to determine the carrier aggregation parameter and at least one user-specific SRS parameter that are used in transmitting the SRS field.

According to a further embodiment of the present invention, there is provided an apparatus for dynamically triggering an aperiodic uplink sounding reference signal SRS for a carrier aggregation system, wherein an uplink schedule in the system comprises an SRS request field, the apparatus comprising:

first pre-assigning means configured to pre-assign mapping relationships between different values of the SRS request field in the uplink schedule and joint coding of a carrier aggregation parameter and at least one user-specific SRS parameter, the carrier aggregation parameter indicating one or more carrier components;

first determining means configured to determine the carrier aggregation parameter and the at least one user-specific SRS parameter;

first value assigning means configured to assign a value to the SRS request field in the uplink schedule based on the pre-assigned mapping relationships, the determined carrier aggregation parameter, and the at least one user-specific SRS parameter;

first transmitting means configured to transmit the uplink schedule.

According to a further embodiment of the present invention, there is provided a method of dynamically triggering an aperiodic uplink sounding reference signal SRS for a carrier aggregation system, wherein an uplink schedule in the system comprises a 1-bit SRS request field and a carrier indicator CIF field, the method comprising:

pre-assigning mapping relationships between different values of the SRS request field and of the CIF field in the uplink schedule and a carrier aggregation parameter, the carrier aggregation parameter indicating one or more carrier components;

determining the carrier aggregation parameter;

assigning a value to the SRS request field in the uplink schedule based on the pre-assigned mapping relationships and the determined carrier aggregation parameter;

transmitting the uplink grant.

According to another embodiment of the present invention, there is provided a method for transmitting an aperiodic uplink sounding reference signal SRS for a carrier aggregation system, wherein an uplink schedule in the system comprises a 1-bit SRS request field and a CIF field, the method comprising:

pre-assigning mapping relationships between different values of the SRS request field and of the CIF field in the uplink schedule and a carrier aggregation parameter, the carrier aggregation parameter indicating one or more carrier components;

receiving the uplink schedule;

de-mapping the received uplink schedule based on the pre-assigned mapping relationships so as to determine the carrier aggregation parameter that is used for transmitting SRS.

According to another embodiment of the present invention, there is provided an apparatus for dynamically triggering an aperiodic uplink sounding reference signal SRS for a carrier aggregation system, wherein an uplink schedule in the system comprises a 1-bit SRS request field and a CIF field, the apparatus comprising:

second pre-assigning means configured to pre-assign mapping relationships between different values of the SRS request field and of the CIF field in the uplink schedule and a carrier aggregation parameter, the carrier aggregation parameter indicating one or more carrier components;

second determining means configured to determine the carrier aggregation parameter;

second value assigning means configured to assign a value to the SRS request field in the uplink schedule based on the pre-assigned mapping relationships and the determined carrier aggregation parameter;

second transmitting means configured to transmit the uplink schedule.

According to another embodiment of the present invention, there is provided an apparatus for transmitting an aperiodic uplink sounding reference signal SRS for a carrier aggregation system, wherein an uplink schedule in the system comprises a 1-bit SRS request field and a CIF field, the apparatus comprising:

fourth pre-assigning means configured to pre-assign mapping relationships between different values of the SRS request field and of the CIF field in the uplink schedule and a carrier aggregation parameter;

receiving means configured to receive the uplink schedule;

de-mapping means configured to de-map the received uplink schedule based on the pre-assigned mapping relationships so as to determine the carrier aggregation parameter that is used for transmitting SRS.

BRIEF DESCRIPTION OF THE DRAWINGS

Through reading the following detailed depiction on the non-limiting embodiments with reference to the accompanying drawings, the other features, objectives, and advantages of the present invention will become more apparent.

DETAILED DESCRIPTION OF THE INVENTION

Hereinafter, the specific embodiments according to the present invention will be described with reference to the accompanying drawings.

Embodiments of the present invention solve the pending problems with respect to aperiodic SRS triggering in the RAN1-#62bis meeting.

Aperiodic SRS triggering by using an uplink schedule has been proposed on the RAN1-#62bis meeting. The uplink schedule may employ the downlink control information (DCI) format 4 or the DCI format 0. It has been agreed that when the uplink schedule employs the DCI format 4, a 2 or 3-new-bit SRS request field is used for aperiodic SRS dynamic triggering. One state of the 2 or 3 new bits indicates not activating the aperiodic SRS. The 2 or 3 new bits may otherwise indicate aperiodic SRS transmission parameters of 3 groups or 7 groups of RRC configurations, respectively. On this meeting, it was also agreed that when the uplink schedule employs the DCI format 0, a 1-new-bit (configured by RRC)

SRS request field indicates activating the aperiodic SRS. In a UE common search space, activation of the aperiodic SRS is not supported.

It was also agreed on the RAN 1-#62 meeting that a cell-specific SRS configuration parameter is not only applied for periodic sounding, but also for aperiodic sounding. However, for a UE-specific SRS configuration parameter (such as SRS bandwidth, SRS frequency domain starting position, SRS transmission comb offset, and SRS cyclic shift), the periodic SRS and aperiodic SRS may be different.

However, on that meeting, it was not proposed yet how to use these limited bits to configure various parameters of aperiodic SRS, and further the specialty of carrier aggregation system was not taken into account.

Based on the above provisions, embodiments of the present invention propose a solution of configuring a set of reasonable and efficient parameters for dynamical aperiodic SRS triggering in the carrier aggregation system based on the 2 or 3 new bits in the DCI format 4. The present invention further provides a solution of dynamically configuring an aperiodic SRS parameter based on the 1 new bit and the carrier indicator (CIF) in the DCI format 0. The present invention mainly considers user-specific SRS parameters. For the sake of simplicity, SRS parameters refer to user-specific SRS parameters, unless otherwise indicated.

The solutions of the embodiments of the present invention may achieve a tradeoff between the flexibility of aperiodic SRS transmission and limited L1/L2 control signaling.

The basic concept of the embodiments of the present invention is to configure key parameters in user-specific aperiodic SRS parameters or a combination thereof by using a limited-bit SRS request field in an uplink schedule in order to provide the flexibility of SRS configuration. Other user-specific aperiodic parameters may be pre-assigned with fixed values, or configured identically or differently with respect to each CC by RRC signaling, or configured by borrowing unused reserving states of other control fields in the uplink schedule. However, these borrowed reserving states should not affect conventional UL CH data transmission. Because the uplink schedule is L1/L2 control signaling, its executing speed is fast at a level of 1 ms which is far higher than the executing time of RRC signaling. Thus, the SRS parameters may be quickly adjusted and the SRS transmission flexibility may be improved.

The key SRS parameters as taken into consideration in the present invention comprise indicating to trigger the aperiodic SRS carrier aggregation (CA) parameters of which UL CCs. The key SRS parameters as taken into account in the present invention may further comprise at least one of the following parameters: SRS time interval parameter, SRS transmission comb offset parameter, SRS frequency domain hopping switch, cyclic shift index offset parameter, etc.

The meanings of SRS time interval, SRS transmission comb offset, and cyclic shift index are identical to the meanings of the same parameters in Rel-8, which, referring to Table 1, will not be further illustrated here.

TABLE 1

Rel_8 UE-Specific Periodic SRS Parameters

| SRS parameters | Bit number | Parameter description |
| --- | --- | --- |
| srsBandwidth | 2 | SRS bandwidth |
| frequencyDomainPosition | 5 | SRS frequency domain position |
| srsHoppingBandwidth | 2 | SRS frequency domain hopping size |
| duration | 1 | SRS time interval, indicating whether it is a single SRS or a periodic SRS. Note: eNB may require a single SRS transmission from UE or require the UE to periodically transmit SRS till the end |
| srsConfigurationIndex | 10 | Srs configuration index, the cycle for UE to transmit SRS and the SRS subframe offset amount during a period of time |
| transmissionComb | 1 | SRS transmission comb offset amount Note: SRS may be transmitted on odd combs or even combs, corresponding to offset 0 or 1 respectively. |
| $N_{SRS}^{CS}$ | 3 | Cyclic shift index Note: each SRS comb supports 8 (with equal interval) cyclic time shift; the cyclic time shift of each UE is independently configured. |

The SRS frequency domain hopping switch indicates whether the SRS is transmitted over the entire frequency domain or transmitted by hopping. It may be used in combination with the parameter of SRS frequency domain hopping size.

The SRS cyclic shift index offset amount (CSoffset) indicates the offset amount of cyclic shift index.

Hereinafter, solutions of configuring aperiodic SRS parameters using the limited bits in DCI format 4 and 0 will be described hereinafter.

2 New Bits in the DCI Format 4 are Used for Aperiodic SRS Triggering

In this scenario, 2 bits may indicate 4 states. In additional to no SRS triggering (namely, state 0), only 3 states with SRS triggering may be configured. Embodiments of the present invention propose assigning a value to a 2-bit SRS request field by using joint coding of CA and some specific combinations of other parameters. Hereinafter, examples of some combinations are provided.

Solution 1: CA+SRS Time Interval

For example, the mapping relationships of joint coding may be specified below:
state 0: no SRS triggering;
state 1: triggering one-shot SRS on one UL CC;

state 2: triggering multi-shot SRS on one UL CC;
state 3: triggering one-shot SRS on all or a subset of configured UL CCs.

Wherein, the parameter of multi-shot SRS may be pre-defined, which, for example, may be a fixed value, or specifically configured by RRC signaling.

The advantage of this solution is that multi-shot SRS triggering may be supported.

Solution 2: CA+SRS transmission comb offset amount

For example, the mapping relationships of joint coding may be specified below:
state 0: no SRS triggering;
state 1: triggering transmission of aperiodic SRS with one comb offset amount on one UL CC;
state 2: triggering transmission of aperiodic SRS with another comb offset amount on one UL CC;
state 3: triggering transmission of aperiodic SRS with the one comb offset amount or the another comb offset amount on all or a subset of configured ULCCs.

It should be understood that the SRS transmission comb offset amount may have two values that represent odd comb or even comb, respectively. Additionally, the one comb offset amount may be pre-determined or configured by RRC signaling.

In the case of being configured by RRC signaling, the mapping relationships of joint coding may be specified below:
for example, the mapping relationship of joint coding may be specified below:
state 0: no SRS triggering;
state 1: triggering aperiodic SRS with a comb that is configured by RRC signaling on one UL CC;
state 2: triggering aperiodic SRS with a comb+1 that is configured by RRC signaling on one UL CC;
state 3: triggering aperiodic SRS with a comb that is configured by RRC signaling on all or a subset of configured UL CCs.

When the comb configured by RRC signaling is odd comb/even comb, comb+1 configured by the RRC signaling represents even comb/odd comb.

An advantage of this solution is that it is easily configured such that the SRSs on different users (or UL CCs) will not conflict.

Solution 3: CA+SRS frequency domain hopping switch the mapping relationships of joint coding may be specified below:
state 0: no SRS triggering;
state 1: triggering aperiodic SRS with frequency domain hopping on one UL CC;
state 2: triggering aperiodic SRS without frequency domain hopping on one UL CC;
state 3: triggering aperiodic SRS with/without frequency domain hopping on all or a subset of configured UL CCs.

Solution 4: CA+SRS cyclic shift (CS)

the mapping relationships of joint coding may be specified below:
state 0: no SRS triggering;
state 1: triggering aperiodic SRS with CS being offset 0 per the RRC-configured CS index on one UL CC;
state 2: triggering aperiodic SRS with CS being offset+1 per the RRC-configured CS index on one UL CC;
state 3: triggering aperiodic SRS with CS per the RRC-configured CS index on all or a subset of configured UL CCs.

It should be understood that in the above mapping relationships, the CS index offset amount may be pre-assigned, for example, a fixed value 4, or configured with the same or different offset amount with respect to each UL CC by RRC signaling.

Alternatively, the CS index corresponding to each state in the above mapping relationships may not be configured by RRC signaling, but may be a fixed value. For example, the mapping relationships may be specified below:
state 0, no SRS triggering;
state 1: triggering aperiodic SRS with a CS index being 0 on one UL CC;
state 2: triggering aperiodic SRS with a CS index being 4 on one UL CC;
state 3: triggering aperiodic SRS with a CS index being 0 on all or a subset of configured UL CCs.

An advantage of solution 4 is that it may be easily configured such that SRSs on different users (or UL CCs) have different CSs, and thus there would be a good orthogonality and no conflict will be incurred.

It should be understood that although the above has specified 4 kinds of combinations between CA and other parameters and some exemplary mapping relationships, based on the above teaching, other combinations between CA and other parameters, as well as other mapping relationships, may also be contemplated.

3 New Bits in the DCI Format 4 are Used for Aperiodic SRS Triggering.

In this scenario, 3 bits may indicate 8 states. In additional to no SRS triggering (namely, state 0), only 7 states with SRS triggering may be configured. Embodiments of the present invention propose assigning a value to a 3-bit SRS request field by using joint coding of CA and some specific combinations of other parameters. Hereinafter, examples of some combinations are provided.

Solution 5: CA+SRS time interval+SRS transmission comb offset amount the mapping relationships of joint coding may be specified below:
state 0: no SRS triggering;
state 1: triggering transmission of one-shot SRS with one comb offset amount on one UL CC;
state 2: triggering transmission of one-shot SRS with another comb offset amount on one UL CC;
state 3: triggering transmission of multi-shot SRS with one comb offset amount on one UL CC;
state 4: triggering transmission of multi-shot SRS with another comb offset amount on one UL CC;
state 5: triggering one-shot SRS on all or a subset of configured UL CCs, where the comb offset amount conforms to the same amount as configured by RRC signaling;
state 6: triggering one-shot SRS on all or a subset of configured UL CCs, where the comb offset amounts conform to different amounts respectively configured by RRC signaling;—state 7: triggering multi-shot SRS on all or a subset of configured UL CCs, where the comb offset amounts conform to same or different amounts respectively configured by RRC signaling;

It should be understood that, the parameters of multi-shot SRS may be pre-defined, for example, they may be fixed values or specifically configured through RRC signaling.

In the above mapping relationships, the SRS transmission comb offset amounts as indicated by respective states may be predetermined, or configured by RRC signaling. Alternatively, one comb offset amount in the above mapping relationships may be pre-assigned as an odd comb, while the other is pre-assigned as an even comb. Or, these SRS transmission comb offset amounts may be configured by RRC signaling, instead of being fixed as odd combs or even combs.

For example, one comb offset amount in the above mapping relationships may be replaced with a comb configured by RRC, while the other comb offset amount is accordingly different from the comb that is configured by RRC.

Solution 6: CA+SRS cyclic shift the mapping relationships of joint coding may be specified below:

state 0: no SRS triggering;

state 1: triggering aperiodic SRS with CS per the RRC-configured CS index on one UL CC;

state 2: triggering aperiodic SRS with CS being offset+2 per the RRC-configured CS index on one UL CC;

state 3: triggering aperiodic SRS with CS being offset+4 per the RRC-configured CS index on one UL CC;

state 4: triggering aperiodic SRS with CS being offset+6 per the RRC-configured CS index on one UL CC;

state 5: triggering aperiodic SRS with CS being offset+0 per the RRC-configured CS index on all or a subset of configured UL CCs;

state 6: triggering aperiodic SRS with CS being offset+2 per the RRC-configured CS index on all or a subset of configured UL CCs;

state 7: triggering aperiodic SRS with CS being offset+4 per the RRC-configured CS index on all or a subset of configured UL CCs;

Alternatively, in the above mapping relationships, the RRC-configured CS index may be replaced by a predetermined fixed value, for example, CS index 0.

Solution 7: CA+SRS cyclic shift+SRS transmission comb offset the mapping relationships of joint coding may be specified below:

state 0: no SRS triggering;

state 1: triggering transmission of aperiodic SRS with CS per the RRC-configured CS index and with one comb offset amount on one UL CC;

state 2: triggering transmission of aperiodic SRS with CS being offset by one CS offset amount per the RRC-configured CS index and with one comb offset amount on one UL CC;

state 3: triggering transmission of aperiodic SRS with CS per the RRC-configured CS index and with another comb offset amount that is different from the one comb offset amount on one UL CC;

state 4: triggering transmission of aperiodic SRS with CS being offset by one CS offset amount per the RRC-configured CS index and with another comb offset amount on one UL CC;

state 5: triggering transmission of aperiodic SRS with CS per the RRC-configured CS index and with one comb offset amount on all or a subset of configured UL CCs;

state 6: triggering transmission of aperiodic SRS with CS being offset by one CS offset amount per the RRC-configured CS index and with the one comb transmission amount on all or a subset of configured UL CCs;

state 7: triggering transmission of aperiodic SRS with CS being offset by one CS offset amount per the RRC-configured CS index and with the another comb transmission amount on all or a subset of configured UL CCs.

It should be understood that although the above has specified 3 kinds of combinations between CA and other parameters as well as some exemplary mapping relationships, based on the above teaching, other combinations between CA and other parameters, as well as other mapping relationships, may also be contemplated.

Configuration of Performing Aperiodic SRS Triggering by Using DCI Format 0

Embodiments of the present invention propose using a 1-new-bit SRS request field to indicate whether to activate aperiodic SRS. Further, in the embodiments of the present invention, if no value is assigned to the CIF field in the DCI format 0, it indicates triggering a set of aperiodic SRSs on multiple UL CCs. When triggering a set of aperiodic SRSs on multiple UL CCs, regarding exactly the aperiodic SRS of which UL CCs are triggered, it may be indicated by the reserving states of other control fields in the DCI format 0 or indicated by RRC signaling. If the CIF in DCI format 0 is assigned a value, then it may indicate only to trigger the aperiodic SRS on the UL CC assigned by the CIF.

What are described above are several solutions of configuring key parameters in user-specific aperiodic SRS parameters or a combination thereof by using a limited-bit SRS request field in an uplink schedule according to the present invention. Compared with the RRC-configured SRS parameters, the solutions of the present invention are more flexible. Moreover, the solutions of the present invention take the scenario of carrier aggregation into account, wherein, at least one state indicates triggering aperiodic SRS transmission on one UL CC (namely, the CIF-appointed UI CC) with respect to UL schedule. Further, another state indicates triggering aperiodic SRS transmission with respect to all configured UL CCs or a subset of UI CCs configured by RRC signaling. It achieves flexibility between prioritized schedule resource and SRS parameter configuration.

Additionally, in the several solutions of the present invention, besides considering carrier aggregate parameters, it further considers in priority SRS transmission comb offset amount and/or SRS cyclic shift parameters in the uplink schedule. Thus, the combs and cyclic shift indexes as used for SRS transmission may be timely changed as required, thereby avoiding conflicts between different users.

Hereinafter, methods of dynamically triggering an aperiodic uplink sounding reference signal SRS for a carrier aggregation system, methods of transmitting an aperiodic uplink sounding reference signal SRS for a carrier aggregation system, and corresponding apparatuses will be described in detail with reference to the following drawings.

Figure 1:
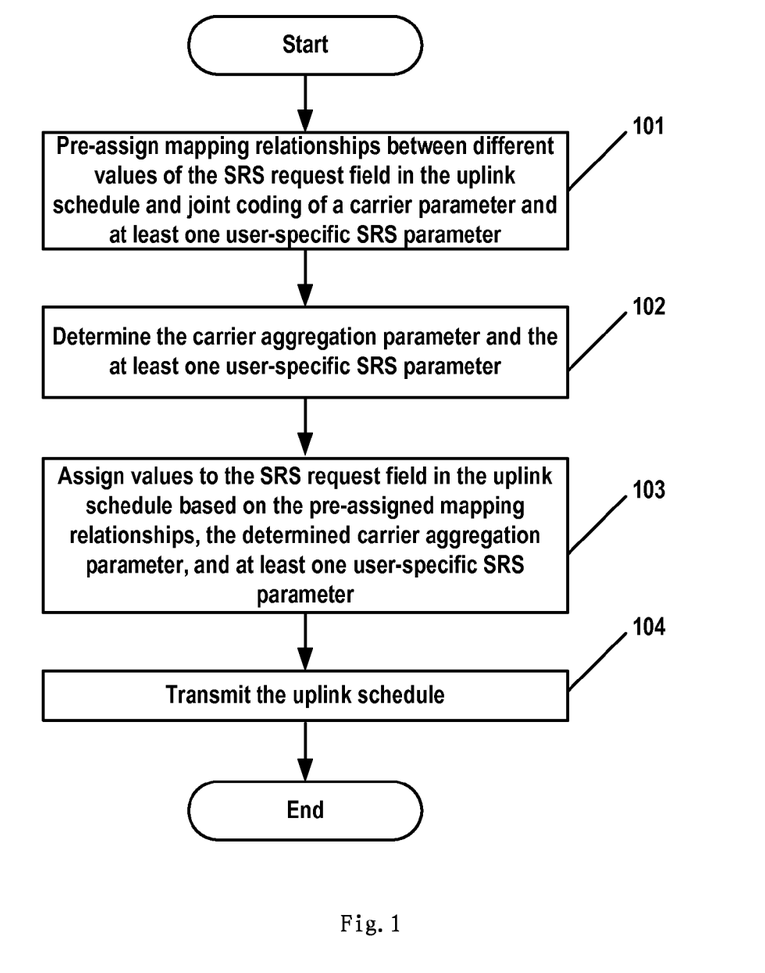
FIG. 1 illustrates a flow chart of a method of dynamically triggering an aperiodic uplink sounding reference signal SRS for a carrier aggregation system according to one embodiment of the present invention.

FIG. 1 illustrates a flow chart of a method of dynamically triggering an aperiodic uplink sounding reference signal SRS for a carrier aggregation system according to the embodiments of the present invention. The uplink schedule in the system includes an SRS request field. As illustrated in FIG. 1, at step 101, mapping relationships between different values of the SRS request field in the uplink schedule and joint coding of a carrier aggregation parameter and at least one user-specific SRS parameter are pre-assigned. At step 102, the carrier aggregation parameter and the at least one user-specific SRS parameter are determined. At step 103, values are assigned to the SRS request field in the uplink schedule based on the pre-assigned mapping relationships, the determined carrier aggregation parameter, and the at least one user-specific SRS parameter. At step 104, the uplink schedule is transmitted.

According to one embodiment of the present invention, the SRS request field is of 2 bits or 3 bits.

According to one embodiment of the present invention, the at least one user-specific SRS parameter is one or two of the following parameters:

SRS time interval, SRS transmission comb offset amount, SRS frequency domain hopping switch, cyclic shift index offset amount.

According to one embodiment of the present invention, the at least one user-specific SRS parameter is SRS time interval, wherein the SRS request field is of 2 bits, and the four different values of the SRS request field are mapped as follows, respectively:

no SRS triggering;
triggering one-shot SRS on one UL CC;
triggering multi-shot SRS on one UL CC;
triggering one-shot SRS on all or a subset of configured UL CCs.

Alternatively, the four different values of the SRS request field may also be mapped as:

no SRS triggering;
triggering one-shot SRS on one UL CC;
triggering multi-shot SRS on one UL CC;
triggering multi-shot SRS on all or a subset of configured UL CCs.

According to one embodiment of the present invention, the at least one user-specific SRS parameter is SRS transmission comb offset, wherein the SRS request field is of 2 bits, and the four different values of the SRS request field are mapped as follows, respectively:

no SRS triggering;
triggering transmission of aperiodic SRS with one comb offset amount on one UL CC,
triggering transmission of aperiodic SRS with another comb offset amount that is different from the one comb offset amount on one UL CC;
triggering transmission of aperiodic SRS with one comb offset amount on all or a subset of configured multiple UL CCs.

Alternatively, the four different values of the SRS request field are also mapped as:

no SRS triggering;
triggering transmission of aperiodic SRS with one comb offset amount on one UL CC,
triggering transmission of aperiodic SRS with another comb offset amount that is different from the one comb offset amount on one UL CC;
triggering transmission of aperiodic SRS with the another comb offset amount on all or a subset of configured multiple UL CCs.

Wherein, the one comb offset amount may be pre-determined or configured by RRC signaling.

According to one embodiment of the present invention, the at least one user-specific SRS parameter is SRS frequency domain hopping switch, wherein the SRS request field is of 2 bits, and the four different values of the SRS request field are mapped as follows, respectively:

no SRS triggering;
triggering aperiodic SRS with frequency domain hopping on one UL CC;
triggering aperiodic SRS without frequency domain hopping on one UL CC;
triggering aperiodic SRS with/without frequency domain hopping on all or a subset of configured UL CCs.

According to one embodiment of the present invention, the at least one user-specific SRS parameter is SRS cyclic shift index CS offset amount, wherein the SRS request field is of 2 bits, and the 4 different values of the SRS request field are mapped as follows, respectively:

no SRS triggering;
triggering aperiodic SRS with CS per the RRC-configured CS index on one UL CC;
triggering aperiodic SRS with CS being offset by one CS offset amount per the RRC-configured CS index on one UL CC;
triggering aperiodic SRS with CS per the RRC-configured CS index on all or a subset of configured UL CCs.

Alternatively, the four different values of the SRS request field may also be mapped as:

no SRS triggering;
triggering aperiodic SRS with CS per RRC-configured CS index on one UL CC;
triggering aperiodic SRS with CS being offset by one CS offset amount per the RRC-configured CS index on one UL CC;
triggering aperiodic SRS with CS being offset by one CS offset amount per the RRC-configured CS index on all or a subset of configured multiple UL CCs.

According to one embodiment of the present invention, the at least one user-specific SRS parameter is SRS time interval and SRS transmission comb offset, wherein the SRS request field is of 3 bits, and the eight different values of the SRS request field are mapped as follows, respectively:

no SRS triggering;
triggering transmission of one-shot SRS with one comb offset amount on one UL CC;
triggering transmission of one-shot SRS with another comb offset amount that is different from the one comb offset amount on one UL CC;
triggering transmission of multi-shot SRS with one comb offset amount on one UL CC;
triggering transmission of multi-shot SRS with another comb offset amount on one UL CC;
triggering one-shot SRS on all or a subset of configured multiple UL CCs, wherein the comb offset amounts corresponding to respective UL CCs conform to the same amount configured by RRC signaling;
triggering one-shot SRS on all or a subset of configured multiple UL CCs, wherein the comb offset amounts corresponding to respective UL CCs conform to different amounts configured by RRC signaling, respectively;
triggering multi-shot SRS on all or a subset of configured multiple UL CCs, wherein the comb offset amounts corresponding to respective UL CCs conform to the same amount/different amounts configured by RRC signaling;

According to one embodiment of the present invention, the at least one user-specific SRS parameter is SRS cyclic shift index CS offset amount, wherein the SRS request field is of 3 bits, and the eight different values of the SRS request field are mapped as follows, respectively:

no SRS triggering;
triggering aperiodic SRS with CS being offset 0 per the RRC-configured CS index on one UL CC;
triggering aperiodic SRS with CS being offset+2 per the RRC-configured CS index on one UL CC;
triggering aperiodic SRS with CS being offset+4 per the RRC-configured CS index on one UL CC;
triggering aperiodic SRS with CS being offset+6 per the RRC-configured CS index on one UL CC;
triggering aperiodic SRS with CS being offset 0 per the RRC-configured CS index on all or a subset of configured UL CCs.
triggering periodic SRS with CS being offset 2 per the RRC-configured CS index on all or a subset of configured UL CCs;
triggering periodic SRS with CS being offset 4 per the RRC-configured CS index on all or a subset of configured UL CCs.

According to one embodiment of the present invention, the at least one user-specific SRS parameter is SRS cyclic shift index CS offset amount and SRS transmission comb offset amount, wherein the SRS request field is of 3 bits, and the eight different values of the SRS request field are mapped as follows, respectively:

no SRS triggering;

triggering transmission of aperiodic SRS with CS per RRC-configured CS index and with one comb offset amount on one UL CC;

triggering transmission of aperiodic SRS with CS being offset by one CS offset amount per the RRC-configured CS index and with one comb offset amount on one UL CC;

triggering transmission of aperiodic SRS with CS per the RRC-configured CS index and with another comb offset amount that is different from the one comb offset amount on one UL CC;

triggering transmission of aperiodic SRS with CS being offset by one CS offset amount per the RRC-configured CS index and with the another comb offset amount on one UL CC;

triggering transmission of aperiodic SRS with CS per the RRC-configured CS index and with the one comb offset amount on all or a subset of configured multiple UL CCs;

triggering transmission of aperiodic SRS with CS being offset by one CS offset amount per the RRC-configured CS index and with the one comb offset amount on all or a subset of configured UL CCs;

triggering transmission of aperiodic SRS with CS being offset by one CS offset amount per the RRC-configured CS index and with the another comb offset amount on all or a subset of configured UL CCs.

Figure 2:
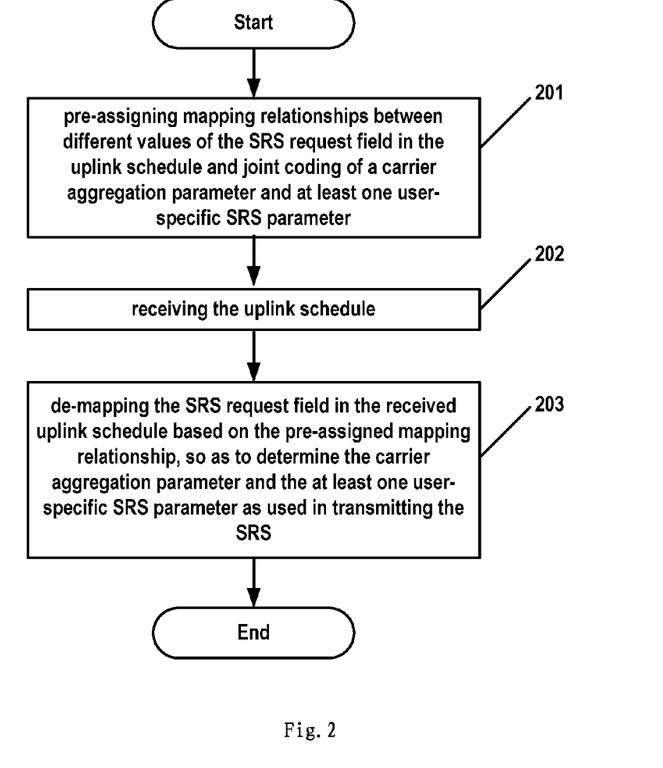
FIG. 2 illustrates a flow chart of a method of transmitting an aperiodic uplink sounding reference signal SRS for a carrier aggregation system according to one embodiment of the present invention.

FIG. 2 illustrates a flow chart of a method of transmitting an aperiodic uplink sounding reference signal SRS for a carrier aggregation system according to one embodiment of the present invention. The uplink schedule in the system includes an SRS request field. As illustrated in FIG. 2, at step 201, mapping relationships between different values of the SRS request field in the uplink schedule and joint coding of a carrier aggregation parameter and at least one user-specific SRS parameter are pre-assigned. At step 202, the uplink schedule is received. At step 203, the SRS request field in the received uplink schedule is de-mapped based on the pre-assigned mapping relationships so as to determine the carrier aggregation parameters and the at least one user-specific SRS parameter that are used in transmitting SRS.

According to one embodiment of the present invention, the SRS request field is of 2 bits or 3 bits.

According to one embodiment of the present invention, the at least one user-specific SRS parameter comprises one or two of the following parameters:

SRS time interval, SRS transmission comb offset amount, SRS frequency domain hopping switch, cyclic shift index offset amount.

The mapping relationships between the combinations of different parameters and the joint coding in FIG. 2 are identical to the mapping relationships between the combinations of different parameters and the joint coding as depicted in FIG. 1. For the sake of simplicity, it will not be described in details here.

Figure 3:
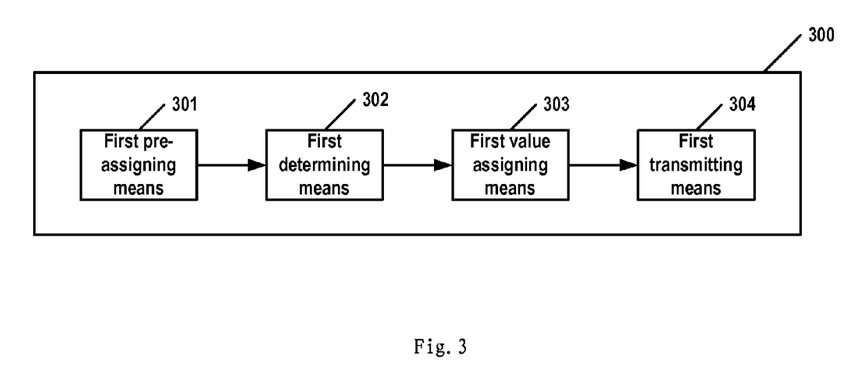
FIG. 3 illustrates a block diagram of an apparatus for dynamically triggering an aperiodic uplink sounding reference signal SRS for a carrier aggregation system according to one embodiment of the present invention.

FIG. 3 illustrates a block diagram of an apparatus for dynamically triggering an aperiodic uplink sounding reference signal SRS 300 for a carrier aggregation system according to one embodiment of the present invention. The apparatus 300 may be a base station, an apparatus in the base station, or an apparatus connected to the base station. For example, it may be an eNB in an LTE system. The uplink schedule in the system includes an SRS request field. As illustrated in FIG. 3, the apparatus 300 comprises first pre-assigning means 301, first determining means 302, first value assigning means 303, and first transmitting means 304. The first pre-assigning means 301 is configured to pre-assign mapping relationships between different values of the SRS request field in the uplink schedule and joint coding of a carrier aggregation parameter and at least one user-specific SRS parameters. The first determining means 302 is configured to determine the carrier aggregation parameter and the at least one user-specific SRS parameter. The first value assigning means 303 is configured to assign values to the SRS request field in the uplink schedule based on the pre-assigned mapping relationships, the determined carrier aggregation parameter, and the at least one user-specific SRS parameter. The first transmitting means 304 is configured to transmit the uplink schedule.

According to one embodiment of the present invention, the at least one user-specific SRS parameter comprises one or two of the following parameters:

SRS time interval, SRS transmission comb offset amount, SRS frequency domain hopping switch, cyclic shift index offset amount.

The apparatus 300 may be used to implement the method as illustrated in FIG. 1, wherein the mapping relationships between the combinations of different parameters and the joint coding are identical to the mapping relationships between the combinations of different parameters and the joint coding as depicted with reference to FIG. 1. For the sake of simplicity, it will not be described in details here.

Figure 4:
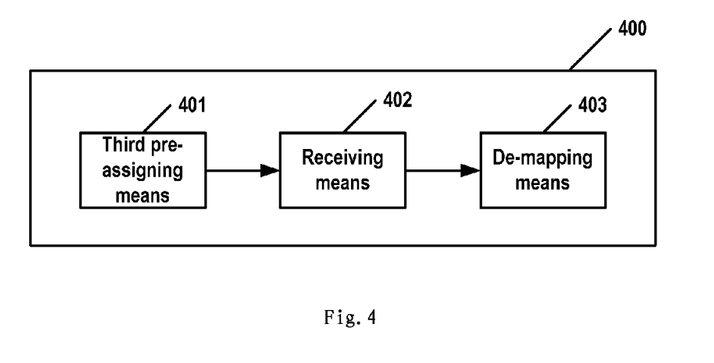
FIG. 4 illustrates a block diagram of an apparatus for transmitting an aperiodic uplink sounding reference signal SRS for a carrier aggregation system according to one embodiment of the present invention.

FIG. 4 illustrates a block diagram of an apparatus for transmitting an aperiodic uplink sounding reference signal SRS 400 for a carrier aggregation system according to one embodiment of the present invention. The apparatus 400, for example, may be a user equipment, or a device in the user equipment. The user equipment, for example, may be a mobile telephone, a portable computer, etc. The uplink schedule in the system includes an SRS request field. The apparatus 400 comprises third pre-assigning means 401, receiving means 402, and de-mapping means 403. The third pre-assigning means 401 is configured to pre-assign mapping relationships between different values of the SRS request field in the uplink schedule and joint coding of a carrier aggregation parameter and at least one user-specific SRS parameter. Receiving means 402 is configured to receive uplink schedule. De-mapping 403 is configured to de-map the SRS request field in the received uplink schedule based on the pre-assigned mapping relationships so as to determine the carrier aggregation parameter used in transmitting the SRS and at least one user-specific SRS parameter.

The apparatus 400 may be used to implement the method as illustrated in FIG. 2, wherein the mapping relationships between the combinations of different parameters and the joint coding are identical to the mapping relationships between the combinations of different parameters and the joint coding as depicted with reference to FIG. 1. For the sake of simplicity, it will not be described in details here.

Figure 5:
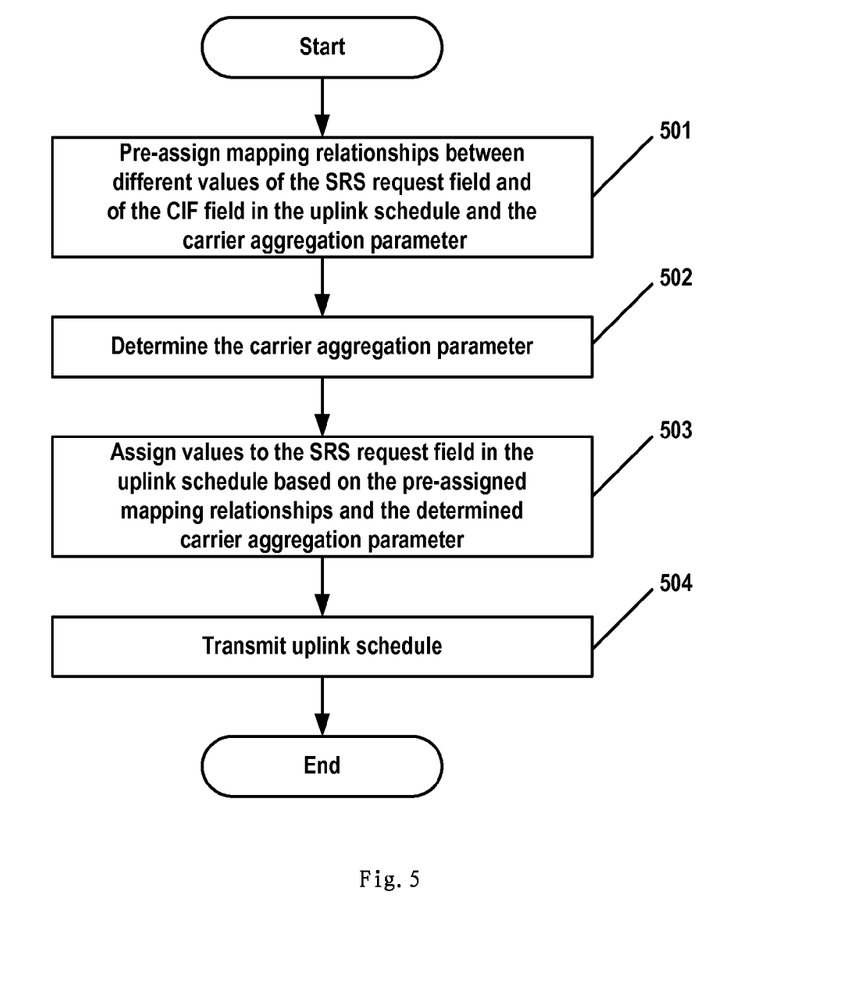
FIG. 5 illustrates a flow chart of a method of dynamically triggering an aperiodic uplink sounding reference signal SRS for a carrier aggregation system according to another embodiment of the present invention.

FIG. 5 illustrates a flow chart of a method of dynamically triggering an aperiodic uplink sounding reference signal SRS for a carrier aggregation system according to another embodiment of the present invention. The uplink schedule in the system comprises a 1-bit SRS request field and a carrier indicator CIF field. As illustrated in FIG. 5, at step 501, mapping relationships between different values of the SRS request field and of the CIF field in the uplink schedule and a carrier aggregation parameter are pre-assigned. At step 502, the carrier aggregation parameter is determined. At step 503, values are assigned to the SRS request field in the uplink schedule based on the pre-assigned mapping relationships and the determined carrier aggregation parameter. At step 504, the uplink schedule is transmitted.

According to one embodiment of the present invention, the mapping relationships comprise:

A first value of the SRS request field is mapped as no SRS triggering;

A second value of the SRS request field in combination with the CIF field with no values assigned is mapped to trigger aperiodic SRS on multiple UL CCs.

According to one embodiment of the present invention, the multiple UL CCs are configured through RRC signaling or configured through the state of unused other control field in the uplink schedule.

Figure 6:
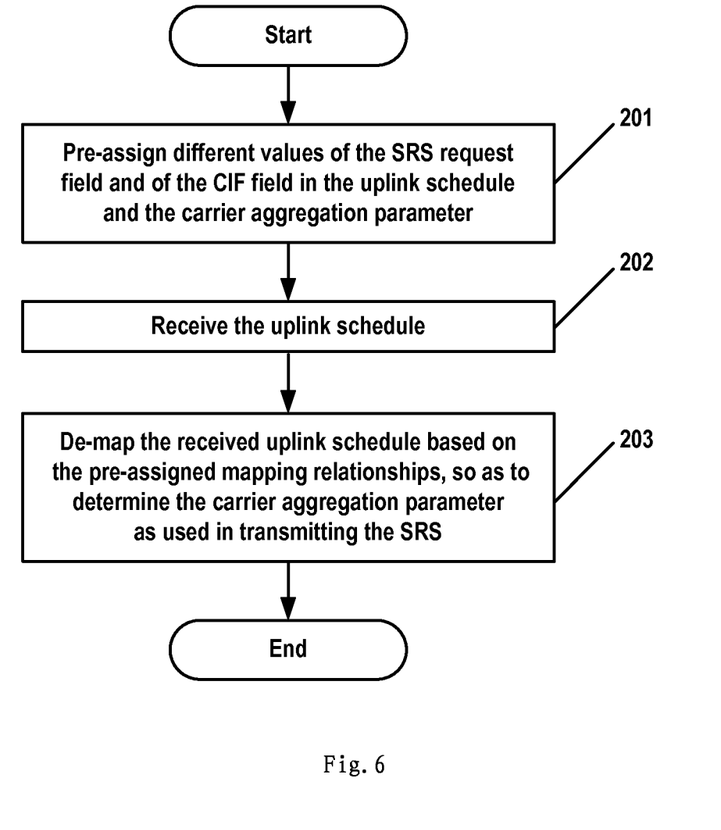
FIG. 6 illustrates a flow chart of a method of transmitting an aperiodic uplink sounding reference signal SRS for a carrier aggregation system according to a further embodiment of the present invention.

FIG. 6 illustrates a flow chart of a method of transmitting an aperiodic uplink sounding reference signal SRS for a carrier aggregation system according to one embodiment of the present invention. The uplink schedule in the system comprises a 1-bit SRS request field and a CIF field. As illustrated in FIG. 6, at step 601, mapping relationships between different values of the SRS request field and of the CIF field in the uplink schedule and a carrier aggregation parameter are pre-assigned. At step 602, the uplink schedule is received. At step 603, the received uplink schedule is de-mapped based on the pre-assigned mapping relationships so as to determine the carrier aggregation parameter used in transmitting SRS.

According to one embodiment of the present invention, the mapping relationships comprise:

A first value of the SRS request field is mapped as no SRS triggering;

A second value of the SRS request field in combination with the CIF field with no values assigned is mapped to trigger aperiodic SRS on multiple UL CCs.

According to one embodiment of the present invention, the multiple UL CCs are configured through RRC signaling or configured through the state of unused other control field in the uplink schedule.

Figure 7:
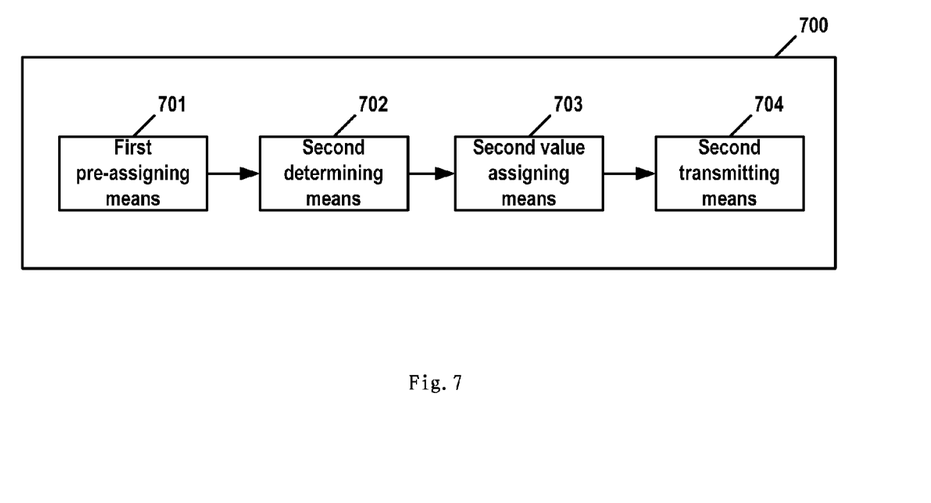
FIG. 7 illustrates a block diagram of an apparatus for dynamically triggering an aperiodic uplink sounding reference signal SRS for a carrier aggregation system according to another embodiment of the present invention.

FIG. 7 illustrates a block diagram of an apparatus 700 for dynamically triggering an aperiodic uplink sounding reference signal SRS for a carrier aggregation system according to one embodiment of the present invention. The apparatus 700 may be a base station, an apparatus in the base station, or an apparatus connected to the base station. For example, it may be an eNB in an LTE system. The uplink schedule in the system comprises a 1-bit SRS request field and a CIF field. The apparatus 700 comprises first pre-assigning means 701, second determining means 702, second value assigning means 703, and second transmitting means 704. The first pre-assigning means 701 is configured to pre-assign mapping relationships between different values of the SRS request field and of the CIF field in the uplink schedule and a carrier aggregation parameter. The second determining means 702 is configured to determine the carrier aggregation parameter. The second value assigning means 703 is configured to assign values to the SRS request field in the uplink schedule based on the pre-assigned mapping relationships and the determined carrier aggregation parameter. The second transmitting means 704 is configured to transmit the uplink schedule.

The apparatus 700 may be configured to implement the method as illustrated in FIG. 5, wherein the mapping relationships are identical to the mapping relationships as depicted in FIG. 5. For the sake of simplicity, it will not be described in details here.

Figure 8:
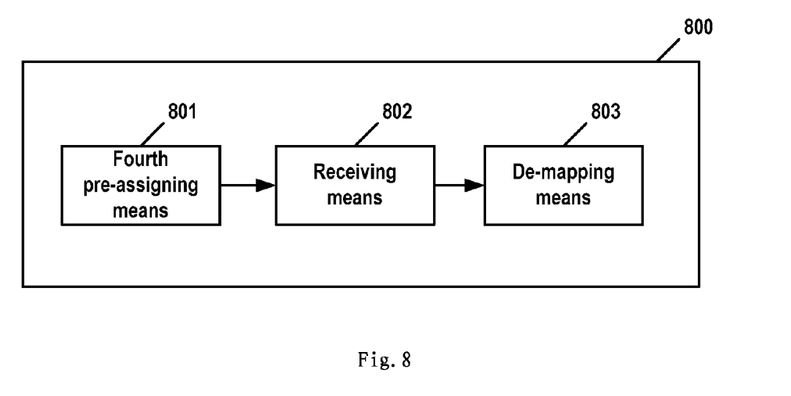
FIG. 8 illustrates a block diagram of an apparatus for transmitting an aperiodic uplink sounding reference signal SRS for a carrier aggregation system according to another embodiment of the present invention.

FIG. 8 illustrates a block diagram of an apparatus 800 for transmitting an aperiodic uplink sounding reference signal SRS for a carrier aggregation system according to one embodiment of the present invention. The apparatus 800, for example, may be a user equipment, or a device in the user equipment. The user equipment, for example, may be a mobile telephone, a portable computer, etc. The uplink schedule in the system comprises a 1-bit SRS request field and a CIF field. The apparatus 800 comprises fourth pre-assigning means 801, receiving means 802, and de-mapping means 803. The fourth pre-assigning means 801 is configured to pre-assign mapping relationships between different values of the SRS request field and of the CIF field in the uplink schedule and a carrier aggregation parameter. The receiving means 802 is configured to receive uplink schedule. The de-mapping means 803 is configured to de-map the received uplink schedule based on the pre-assigned mapping relationships so as to determine the carrier aggregation parameter used in transmitting SRS.

The apparatus 800 may be configured to implement the method as illustrated in FIG. 6, wherein the mapping relationships are identical to the mapping relationships as depicted in FIG. 6. For the sake of simplicity, it will not be described in details here.

According to the embodiments of the present invention, key parameters in user-specific aperiodic SRS parameters or a combination thereof are configured by using a limited-bit SRS request field in an uplink schedule, so as to provide flexibility for SRS configuration. Other user-specific aperiodic SRS parameters may be pre-assigned with fixed values, or configured identically or differently with respect to each CC by RRC signaling, or configured based on unused reserving states of other control fields in the uplink schedule. Because the uplink schedule is L1/L2 control signaling, its executing speed is fast at a level of 1 ms, which is far higher than the executing time of RRC signaling. Thus, the embodiments of the present invention may quickly adjust the SRS parameters and improve the SRS transmission flexibility.

The above has depicted the embodiments of the present invention. However, the present invention is not limited to specific methods and apparatuses. Those skilled in the art may make various transformations or amendments within the scope of the appended claims.

What is claimed is:

1. A method of dynamically triggering an aperiodic uplink sounding reference signal SRS for a carrier aggregation system, wherein an uplink schedule in the system comprises an SRS request field, the method comprising:

pre-assigning mapping relationships between different values of the SRS request field in the uplink schedule and joint coding of a carrier aggregation parameter and at least one user-specific SRS parameters, the carrier aggregation parameter indicating one or more carrier component;

determining the carrier aggregation parameter and the at least one user-specific SRS parameter;

assigning values to the SRS request field in the uplink schedule based on the pre-assigned mapping relationships, the determined carrier aggregation parameter, and the at least one user-specific SRS parameter; and transmitting the uplink grant.

2. The method according to claim 1, wherein the at least one user-specific SRS parameter is one or two of the following parameters:

SRS time interval, SRS transmission comb offset amount, SRS frequency domain hopping switch, cyclic shift index offset amount.

3. The method according to claim 1, wherein the at least one user-specific SRS parameter is SRS time interval, the SRS request field is of 2 bits, and the four different values of the SRS request field are mapped as follows, respectively:

no SRS triggering;
triggering one-shot SRS on one UL CC;
triggering multi-shot SRS on one UL CC;

triggering one-shot SRS or multi-shot SRS on all or a subset of configured multiple UL CCs.

4. The method according to claim 1, wherein the at least one user-specific SRS parameter is SRS transmission comb offset, the SRS request field is of 2 bits, and the four different values of the SRS request field are mapped as follows, respectively:
no SRS triggering;
triggering transmission of aperiodic SRS with one comb offset amount on one UL CC;
triggering transmission of aperiodic SRS with another comb offset that is different from the one comb offset on one UL CC;
triggering transmission of aperiodic SRS with the one comb offset or the another comb offset on all or a subset of configured multiple UL CCs.

5. The method according to claim 1, wherein the at least one user-specific SRS parameter is SRS frequency domain hopping switch, the SRS request field is of 2 bits, and the four different values of the SRS request field are mapped as follows, respectively:
no SRS triggering;
triggering aperiodic SRS with frequency domain hopping on one UL CC;
triggering aperiodic SRS without frequency domain hopping on one UL CC;
triggering aperiodic SRS with/without frequency domain hopping on all or a subset of configured multiple UL CCs.

6. The method according to claim 1, wherein the at least one user-specific SRS parameter is SRS cyclic shift index CS offset amount, the SRS request field is of 2 bits, and the four different values of the SRS request field are mapped as follows, respectively:
no SRS triggering;
triggering aperiodic SRS with CS per RRC-configured CS index on one UL CC;
triggering aperiodic SRS with CS being offset by one CS offset amount per the RRC-configured CS index on one UL CC;
triggering aperiodic SRS with CS per RRC-configured CS index on all or a subset of configured multiple UL CCs or triggering aperiodic SRS with CS being offset by one CS offset amount per the RRC-configured CS index on all or a subset of configured multiple UL CCs.

7. The method according to claim 1, wherein the at least one user-specific SRS parameter is SRS time interval and SRS transmission comb offset amount, the SRS request field is of 3 bits, and the eight different values of the SRS request field are mapped as follows, respectively:
no SRS triggering;
triggering transmission of one-shot SRS with one comb offset amount on one UL CC;
triggering transmission of one-shot SRS with another comb offset amount that is different from the one comb offset amount on one UL CC;
triggering transmission of multi-shot SRS with one comb offset amount on one UL CC;
triggering transmission of multi-shot SRS with another comb offset amount on one UL CC;
triggering one-shot SRS on all or a subset of configured multiple UL CCs, wherein the comb offset amounts corresponding to respective UL CCs conform to the same amount configured by RRC signaling;
triggering one-shot SRS on all or a subset of configured multiple UL CCs, wherein the comb offset amounts corresponding to respective UL CCs conform to different amounts configured by RRC signaling, respectively;
triggering multi-shot SRS on all or a subset of configured multiple UL CCs, wherein the comb offset amounts corresponding to respective UL CCs conform to the same amount/different amounts configured by RRC signaling.

8. The method according to claim 1, wherein the at least one user-specific SRS parameter is SRS cyclic shift index CS offset amount, the SRS request field is of 3 bits, and the eight different values of the SRS request field are mapped as follows, respectively:
no SRS triggering;
triggering aperiodic SRS with CS being offset 0 per the RRC-configured CS index on one UL CC;
triggering aperiodic SRS with CS being offset+2 per the RRC-configured CS index on one UL CC;
triggering aperiodic SRS with CS being offset+4 per the RRC-configured CS index on one UL CC;
triggering aperiodic SRS with CS being offset+6 per the RRC-configured CS index on one UL CC;
triggering aperiodic SRS with CS being offset 0 per the RRC-configured CS index on all or a subset of configured multiple UL CCs;
triggering aperiodic SRS with CS being offset 2 per the RRC-configured CS index on all or a subset of configured multiple UL CCs;
triggering aperiodic SRS with CS being offset 4 per the RRC-configured CS index on all or a subset of configured multiple UL CCs.

9. A method of transmitting an aperiodic uplink sounding reference signal SRS for a carrier aggregation system, wherein an uplink schedule in the system comprises an SRS request field, the method comprising:
pre-assigning mapping relationships between different values of the SRS request field in the uplink schedule and joint coding of a carrier aggregation parameter and at least one user-specific SRS parameter, the carrier aggregation parameter indicating one or more carrier component;
receiving the uplink schedule;
de-mapping the SRS request field in the received uplink schedule based on the pre-assigned mapping relationships so as to determine the carrier aggregation parameter used in transmitting the SRS and the at least one user-specific SRS parameter.

10. An apparatus for dynamically triggering an aperiodic uplink sounding reference signal SRS for a carrier aggregation system, wherein an uplink schedule in the system comprises an SRS request field, the apparatus comprising:
one or more processors configured to:
pre-assign mapping relationships between different values of the SRS request field in the uplink grant and joint coding of a carrier aggregation parameter and at least one user-specific SRS parameter, the carrier aggregation parameter indicating one or more carrier component;
determine the carrier aggregation parameter and the at least one user-specific SRS parameters;
assign a value to the SRS request field in the uplink grant based on the pre-assigned mapping relationships, the determined carrier aggregation parameter, and the at least one user-specific SRS parameter, the carrier aggregation parameter indicating one or more carrier components; and
a first transmitter configured to transmit the uplink schedule.

11. An apparatus for transmitting an aperiodic uplink sounding reference signal SRS for a carrier aggregation system, wherein an uplink schedule in the system comprises an SRS request field, the apparatus comprising:
- one or more processors configured to pre-assign mapping relationships between different values of the SRS request field in the uplink schedule and joint coding of a carrier aggregation parameter and at least one user-specific SRS parameter, the carrier aggregation parameter indicating one or more carrier component;
- a receiver configured to receive the uplink schedule;
- wherein the one or more processors is further configured to de-map the SRS request field in the received uplink schedule based on the pre-assigned mapping relationships so as to determine the carrier aggregation parameter used in transmitting the SRS and the at least one user-specific SRS parameter.

12. A method of dynamically triggering an aperiodic uplink sounding reference signal SRS for a carrier aggregation system, wherein an uplink schedule in the system comprises a 1-bit SRS request field and a carrier indicator CIF field, the method comprising:
- pre-assigning mapping relationships between different values of the SRS request field and of the CIF field in the uplink schedule and a carrier aggregation parameter, the carrier aggregation parameter indicating one or more carrier components;
- determining the carrier aggregation parameter;
- assigning a value to the SRS request field in the uplink schedule based on the pre-assigned mapping relationships and the determined carrier aggregation parameter;
- transmitting the uplink schedule.

13. A method of transmitting an aperiodic uplink sounding reference signal SRS for a carrier aggregation system, wherein an uplink schedule in the system comprises a 1-bit SRS request field and a CIF field, the method comprising:
- pre-assigning mapping relationships between different values of the SRS request field and of the CIF field in the uplink schedule and a carrier aggregation parameter, the carrier aggregation parameter indicating one or more carrier components;
- receiving the uplink schedule;
- de-mapping the received uplink schedule based on the pre-assigned mapping relationships so as to determine the carrier aggregation parameter used in transmitting SRS.

14. An apparatus for dynamically triggering an aperiodic uplink sounding reference signal SRS for a carrier aggregation system, wherein an uplink schedule in the system comprises a 1-bit SRS request field and a CIF field, the apparatus comprising:
- one or more processors configured to:
  - pre-assign mapping relationships between different values of the SRS request field and of the CIF field in the uplink schedule and a carrier aggregation parameter, the carrier aggregation parameter indicating one or more carrier components;
  - determine the carrier aggregation parameter;
  - assign a value to the SRS request field in the uplink schedule based on the pre-assigned mapping relationships and the determined carrier aggregation parameter; and
- a transmitter configured to transmit the uplink schedule.

15. An apparatus for transmitting an aperiodic uplink sounding reference signal SRS for a carrier aggregation system, wherein an uplink schedule in the system comprises a 1-bit SRS request field and a CIF field, the apparatus comprising:
- one or more processors configured to pre-assign mapping relationships between different values of the SRS request field and of the CIF field in the uplink schedule and a carrier aggregation parameter, the carrier aggregation parameter indicating one or more carrier components;
- a receiver configured to receive the uplink schedule;
- wherein the one or more processors is further configured to de-map the received uplink schedule based on the pre-assigned mapping relationships so as to determine the carrier aggregation parameter used in transmitting SRS.

* * * * *